US006950954B1

(12) United States Patent
Sullam et al.

(10) Patent No.: US 6,950,954 B1
(45) Date of Patent: Sep. 27, 2005

(54) METHOD AND CIRCUIT FOR SYNCHRONIZING A WRITE OPERATION BETWEEN AN ON-CHIP MICROPROCESSOR AND AN ON-CHIP PROGRAMMABLE ANALOG DEVICE OPERATING AT DIFFERENT FREQUENCIES

(75) Inventors: Bert Sullam, Bellevue, WA (US);
Harold Kutz, Snoquolmie, WA (US);
Monte Mar, Issaquah, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 516 days.

(21) Appl. No.: 10/011,214

(22) Filed: Oct. 25, 2001

Related U.S. Application Data (60) Provisional application No. 60/243,708, filed on Oct. 26, 2000.

(51) Int. Cl.$^7$ .............................................. G06F 1/12
(52) U.S. Cl. ..................................... 713/400; 713/600
(58) Field of Search ................................ 713/400, 600

(56) References Cited

U.S. PATENT DOCUMENTS

| | | | | |
|---|---|---|---|---|
| 4,134,073 A | * | 1/1979 | MacGregor | 327/161 |
| 4,827,401 A | * | 5/1989 | Hrustich et al. | 713/400 |
| 5,202,687 A | | 4/1993 | Distinti | 341/158 |
| 5,258,760 A | | 11/1993 | Moody et al. | 341/166 |
| 5,371,860 A | * | 12/1994 | Mura et al. | 710/22 |
| 5,414,308 A | | 5/1995 | Lee et al. | 327/293 |
| 5,430,687 A | * | 7/1995 | Hung et al. | 365/230.08 |
| 5,481,747 A | * | 1/1996 | Kametani | 718/102 |
| 5,519,854 A | * | 5/1996 | Watt | 713/401 |
| 5,557,762 A | * | 9/1996 | Okuaki et al. | 714/34 |
| 5,563,526 A | | 10/1996 | Hastings et al. | 326/37 |
| 5,594,734 A | * | 1/1997 | Worsley et al. | 370/395.53 |
| 5,600,262 A | | 2/1997 | Kolze | 326/38 |
| 5,710,906 A | * | 1/1998 | Ghosh et al. | 711/146 |
| 5,982,229 A | * | 11/1999 | Wong et al. | 327/554 |
| 6,144,327 A | | 11/2000 | Distinti et al. | 341/126 |
| 6,166,367 A | | 12/2000 | Cho | 250/208.1 |
| 6,225,866 B1 | | 5/2001 | Kubota et al. | 330/295 |
| 6,249,167 B1 | * | 6/2001 | Oguchi et al. | 327/291 |
| 6,535,946 B1 | * | 3/2003 | Bryant et al. | 710/305 |

(Continued)

OTHER PUBLICATIONS

CYPR-DC00175; "Method for Synchronizing and Resetting Clock Signals Supplied to Multiple Programmable Analog Blocks (as Amended)"; Oct. 1, 2001; 09/969,311; B. Sullam.

(Continued)

*Primary Examiner*—John R. Cottingham
*Assistant Examiner*—Tse Chen
(74) *Attorney, Agent, or Firm*—Wagner, Murabito & Hao LLP (57) ABSTRACT

One embodiment of the present invention includes a microcontroller that enables its on-chip microprocessor to write data into a register of an on-chip programmable analog circuit even though the two circuits may be operating at different frequencies. Specifically, the microcontroller includes a write synchronization circuit that helps facilitate the write operation between these two circuits. For example, the write synchronization circuit is coupled to receive write cycle signals from the microprocessor and is also coupled to receive trigger signals based on a clocking signal received by the programmable analog circuit. Therefore, upon receiving a write cycle signal, the write synchronization circuit has the ability (if needed) to stall the microprocessor's operations until the optimum time for writing data into the register for controlling the programmable analog circuit. As such, the write synchronization circuit dynamically synchronizes the microprocessor's write operation with the programmable analog circuit's optimum timing condition for receiving data.

20 Claims, 8 Drawing Sheets

U.S. PATENT DOCUMENTS

| | | | |
|---|---|---|---|
| 6,567,426 B1 * | 5/2003 | van Hook et al. | 370/535 |
| 6,575,373 B1 * | 6/2003 | Nakano | 235/492 |
| 6,604,179 B2 * | 8/2003 | Volk et al. | 711/167 |
| 6,771,552 B2 * | 8/2004 | Fujisawa | 365/221 |

OTHER PUBLICATIONS

CYPR-CD00189; "System and Method of Providing a Programmable Clock Architecture for an Advanced Microcontroller"; Oct. 24, 2001; 10/000,383; Sullam et al.

CYPR-CD00190; "Method and Circuit for Allowing a Microprocessor to Change its Operating Frequency on-the-fly"; Apr. 2, 2001; 09/826,397; B. Sullam.

CYPR-CD00227; "Architecture for Synchronizing and Resetting Clock signals Supplied to Multiple Analog Programmable System on a Chip Blocks"; Oct. 1, 2001; 09/969,313; B. Sullam.

* cited by examiner

METHOD AND CIRCUIT FOR SYNCHRONIZING A WRITE OPERATION BETWEEN AN ON-CHIP MICROPROCESSOR AND AN ON-CHIP PROGRAMMABLE ANALOG DEVICE OPERATING AT DIFFERENT FREQUENCIES

CROSS REFERENCE TO RELATED APPLICATION

This application claims priority to the copending U.S. provisional patent application Ser. No. 60/243,708 entitled "Advanced Programmable Microcontroller Device" by Snyder et al., filed Oct. 26, 2000.

TECHNICAL FIELD

The present invention generally relates to the field of microprocessors and analog programmable circuits. More particularly, the present invention relates to the field of synchronizing an operation between a microprocessor and an analog programmable circuit.

BACKGROUND ART

Modern research and technology have provided society with a wide variety of different devices. It is appreciated that some of these modern devices are very powerful and useful to their users. For example, some of the modern devices that fall into this category include: computers which occupy large office space down to computers which are held in one's hand, satellites which orbit around earth relaying a multitude of communication signals, global positioning system (GPS) devices capable of determining the specific locations of their users on the earth, microwave ovens capable of quickly cooking food, cellular phones which enable their users to communicate wirelessly with other people, to name a few. Additionally, it should be appreciated that some modern devices also provide entertainment to their users. For instance, some of the modern devices which fall into this category include: portable and fixed televisions which provide a wide variety of visual and audio programming to their users, video cassette recorders (VCRs) which enable their users to record television shows for later viewing and also enable them to watch (for example) prerecorded movies on a television set, portable and fixed radio receivers which provide their users music along with a wide array of different audio programming, video game consoles which challenge their users with varying situations within different virtual realities, and portable and fixed compact disc (CD) players which provide music to their users.

One of the enabling components of several of the above mentioned modern devices is a microcontroller or MCU. Specifically, the microcontroller is typically defined as a single chip (integrated circuit) that includes a processor, volatile memory such as Random Access Memory (RAM), non-volatile memory such as Read Only Memory (ROM), clocking source, and an input/output control unit. As such, the microcontroller is a computer on a chip. It should be appreciated that microcontrollers have been utilized in various applications for many years. Primarily, microcontrollers are used in control-oriented applications that are interrupt-driven, sensing and controlling external events. Microcontrollers are frequently found in a wide variety of devices and applications.

For example, microcontrollers may be found in appliances such as microwave ovens, refrigerators, televisions, VCRs, and stereos. Furthermore, microcontrollers may also be found within computer equipment such as laser printers, modems, and disk drives. Additionally, microcontrollers may be found within automobiles (e.g., engine control, diagnostics, climate control), environmental control devices (e.g., greenhouse, factory, home), aerospace, and thousands of other uses.

It should be understood that microcontrollers may be fabricated to provide particular functionality. As such, there are many different microcontrollers for many different functions. However, there is also an advanced microcontroller which includes one or more digital and/or analog programmable blocks which enable the microcontroller to be specifically programmed to perform different functions. As such, an advanced microcontroller with programmable blocks is typically able to be utilized for a wider variety of different applications than a microcontroller having a fixed functionality.

There are different ways to implement programmable blocks within a microcontroller. For example, the Field Programmable Gate Array (FPGA) has become very popular in recent years, even being utilized in several microcontroller applications. One reason for its popularity is the shortage in design cycle time that may be achieved by using programmable devices. Furthermore, FPGAs can be programmed to realize different digital functions. In particular, many FPGAs have programmable look-up tables to realize different digital functions. Usually, a FPGA contains from a few to tens of thousands of programmable logic blocks and an even greater number of flip-flops, each programmable logic block having a look-up table, multiplexers, and flip-flops. Therefore, by using programmable blocks within a microcontroller, the microcontroller may be programmed so that it can be utilized for a wide variety of different applications.

However, there are disadvantageous associated with microcontrollers that include one or more programmable analog blocks. It should be understood that a programmable analog block may be a block that contains analog circuits (e.g., switch-capacitor circuitry) and registers or latches that control the analog circuits. One disadvantage is that a microprocessor and a programmable analog block typically operate at different frequencies. As such, if data is written from the microprocessor to the programmable analog block at an inopportune time, the analog output may be corrupted. In order to ensure a proper write operation from the microprocessor to the programmable analog block, the write operation has to be properly timed to allow the analog signals in the programmable analog block to fully settle. If control data is received and stored before the analog signals have settled, the analog output from the programmable analog block may be corrupted thereby rendering it useless for most practical purposes.

One typical solution for this write operation timing problem is to utilize a dual port memory device (e.g., FIFO) wherein the microprocessor is able to write data to one of its ports at one frequency while one or more registers of the analog programmable block are able to read data from the other port at a different frequency. However, there are disadvantages associated with this dual port memory solution. For example, a dual port memory consumes too much chip space and it involves complex circuitry.

SUMMARY OF THE INVENTION

Accordingly, a need exists for a method and circuit for synchronizing a write operation between a microprocessor and programmable analog circuit of a microcontroller operating at different frequencies without utilizing too much chip space and without involving complex circuitry. Embodiments of the present invention provide a method and circuit which accomplishes the above mentioned needs.

For example, one embodiment of the present invention includes a microcontroller that enables its on-chip microprocessor to write data into a register of an on-chip programmable analog circuit even though the two circuits may be operating at different frequencies. Specifically, the microcontroller includes a write synchronization circuit that helps facilitate the write operation between these two circuits. For example, the write synchronization circuit is coupled to receive write cycle signals from the microprocessor and is also coupled to receive trigger signals based on a clocking signal received by the programmable analog circuit. Therefore, upon receiving a write cycle signal, the write synchronization circuit has the ability (if needed) to stall the microprocessor's operations until the optimum time for writing data into the register for controlling the programmable analog circuit. As such, the write synchronization circuit dynamically synchronizes the microprocessor's write operation with the programmable analog circuit's optimum timing condition for receiving data.

In another embodiment, the present invention includes a method for synchronizing a write operation between a microprocessor and an analog circuit that are operating at different frequencies. The method includes the action of the microprocessor initiating a write cycle to store data into a register of the analog circuit. The analog circuit operates on a first clock signal of a first rate and the microprocessor operates on a second clock signal of a second rate. Furthermore, the method includes the action of asserting a signal to halt operation of the microprocessor until a predefined time frame of the first clock signal. It is understood that the predefined time frame is advantageous for storing data into the register of the analog circuit. In response to the previous action, the method includes the action of the microprocessor storing the data into the register of the analog circuit.

In yet another embodiment, the present invention includes a system for synchronizing a write operation between a microprocessor and an analog circuit that are operating at different frequencies. The system includes the analog circuit coupled to receive a first clock signal of a first rate. Additionally, the system includes the microprocessor coupled to receive a second clock signal of a second rate and coupled to transmit data to a register of the analog circuit. The microprocessor is for transmitting a write cycle signal to store data into the register of the analog circuit. Moreover, the system includes a synchronization circuit coupled to receive the first clock signal and the write cycle signal. Additionally, the synchronization circuit is for asserting a signal to halt operation of the microprocessor until a predefined time frame of the first clock signal. It is appreciated that the predefined time frame is advantageous for storing data into the register of the analog circuit.

The present invention provides these advantages and others which will no doubt become obvious to those of ordinary skill in the art after having read the following detailed description of embodiments in accordance with the present invention.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within an electronic computing device or electronic circuitry. These descriptions and representations are the means used by those skilled in the art to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in an electronic computing device or electronic circuitry. For reasons of convenience, and with reference to common usage, these signals may be referred to as bits, values, elements, symbols, characters, terms, numbers, or the like with reference to embodiments in accordance with the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "initiating", "synchronizing", "asserting", "storing", "receiving", "determining", "controlling", "transmitting", "providing", "generating", "utilizing" or "outputting" or the like, refer to the action and processes of an electronic computing device or electronic circuitry that manipulates and transforms data. The data is represented as physical (electronic) quantities within an electronic computing device or electronic circuitry (e.g., registers, memories, etc.) and is transformed into other data similarly represented as physical quantities within the electronic computing device or electronic circuitry (e.g., registers, memories, etc.) or other such information storage or transmission device.

Exemplary Hardware in Accordance with the Present Invention

Figure 1:
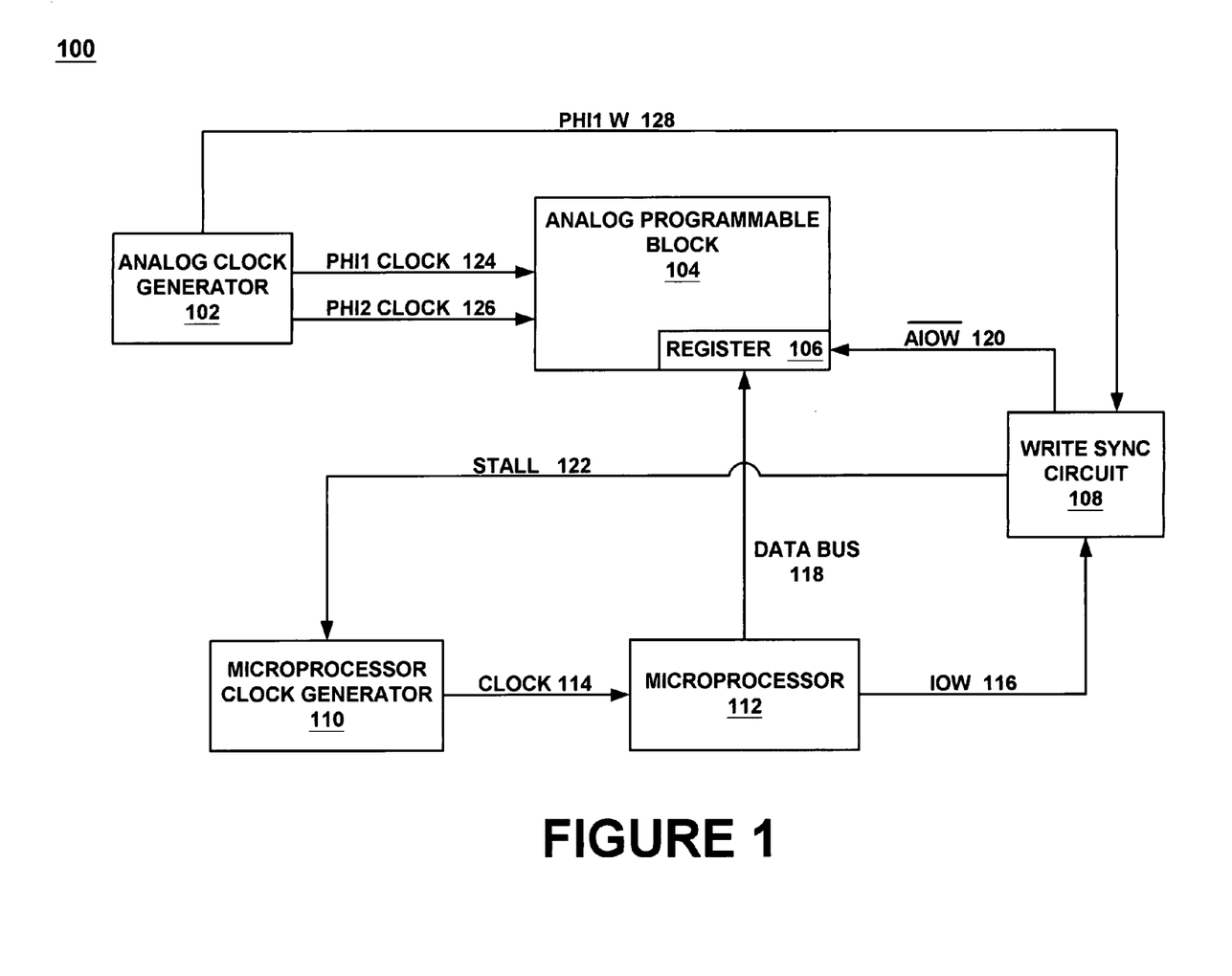
FIG. 1 is a block diagram of exemplary circuitry (that may be part of a microcontroller) in accordance with an embodiment of the present invention.

FIG. 1 is a block diagram of exemplary circuitry 100 in accordance with an embodiment of the present invention that may be implemented as part of a microcontroller. Within the following discussions of embodiments of the present invention, certain processes and steps are discussed that are realized, in one embodiment, as a series of instructions (e.g., software program) that reside within readable memory units of circuitry 100 and executed by processor(s) of circuitry 100. When executed, the instructions cause circuitry 100 to perform specific actions and exhibit specific behavior which is described in detail herein.

Within the present embodiment, circuitry 100 includes a write synchronization (Sync) circuit 108 that is able to synchronize a write operation between microprocessor 112 and programmable analog circuit 104 even though they may be operating at different frequencies. Specifically, the write synchronization circuit 108 is coupled to receive write cycle signals (e.g., IOW 116) from the microprocessor 112 and is also coupled to receive trigger signals (e.g., Phi1W 128) based on a clocking signal (e.g., Phi1 clock 124) received by the programmable analog circuit 104. Therefore, upon receiving a write cycle signal (e.g., IOW 116), the write synchronization circuit 108 has the ability (if needed) to stall the operation of the microprocessor 112 until an optimal time to write data into the register 106 for controlling analog programmable block 104.

More specifically, when the microprocessor 112 of FIG. 1 desires to write data to control the analog programmable circuit 104 (via register 106), it outputs an input/output write cycle (IOW) signal 116 along with the data to be written. The data is output to a data bus 118 by the microprocessor 112 while the write synchronization circuit 108 is coupled to receive the IOW signal 116. Additionally, the write synchronization circuit 108 is coupled to receive a write window signal (e.g., Phi1W) 128 which indicates optimum times that a write operation may be performed with register 106 for controlling analog programmable block 104. As such, upon receiving the IOW signal 116, the write synchronization circuit 108 utilizes the write window signal (e.g., Phi1W) 128 to determine whether it is an optimum time for the microprocessor 112 to write to register 106 for controlling analog programmable block 104. If it is, the write synchronization circuit 108 allows the write operation to proceed unimpeded. However, if it is not an optimum time to write to register 106, the write synchronization circuit 108 asserts a stall signal 122 that halts the operations of microprocessor 112. That is, the stall signal 122 is received by the microprocessor clock generator 110 causing it to stall clocking signal 114 thereby halting the operations of microprocessor 112. Additionally, during the assertion of the stall signal 122, the write synchronization circuit 108 does not allow the register 106 to receive any indication signals that the microprocessor 112 desires to write to it.

When the write synchronization circuit 108 determines that it is an optimum time for the microprocessor 112 to write to register 106 for controlling analog programmable block 104, the write synchronization circuit 108 deactivates the stall signal 122 thereby activating the microprocessor 112. Additionally, the write synchronization circuit 108 outputs an analog input/output write cycle (AIOW over-bar) signal 120 to register 106. As such, the microprocessor 112 writes the data into the register 106 via data bus 118. In this manner, the write synchronization circuit 108 of circuitry 100 is able to synchronize a write operation between microprocessor 112 and programmable analog circuit 104 even though they may be operating at different frequencies.

The circuitry 100 of FIG. 1 may include one or more processors 112 for processing information and instructions. The processor unit 112 of the present embodiment is well-suited to be a microprocessor or any other type of processor. Circuitry 100 also includes a microprocessor clock generator 110 coupled to output a clock signal 114 that is received and utilized by the microprocessor 112. It is understood that clock signal 114 of the present embodiment is well-suited to be any clocking frequency. For example, the clock signal 114 may include a frequency range of 96 kilohertz (kHz) to 24 megahertz (MHz). As previously mentioned, the microprocessor 112 is coupled to output an I/O write cycle (IOW) signal 116 to the write synchronization circuit 108. Furthermore, the microprocessor 112 is coupled to data bus 118 enabling it to transmit data to the analog programmable circuit 104 and the register 106.

The circuitry 100 may include one or more analog programmable blocks 104 which are coupled to a bus (not shown) enabling a software program operating on microprocessor 112 to specifically program it to perform different functions. It should be understood that the analog programmable block 104 may be implemented in a wide variety of ways in accordance with the present embodiment. For example, analog programmable block 104 may be implemented in a manner similar to analog Programmable System-on-Chip™ (PSoC™) blocks provided by Cypress MicroSystems of Bothell, Wash. Specifically, analog PSoC blocks are programmable switched-capacitor (SC) and continuous time (CT) blocks. These blocks can be interconnected and personalized to provide analog to digital converters (ADCs), digital to analog converters (DACs), multipole filters, gain stages, and much more. Furthermore, it is appreciated that analog PSoC blocks may be connected in parallel or serial. Parallel connection of analog PSoC blocks increases precision of the function. A single analog PSoC block provides a 6-bit DAC. Two analog PSoC blocks provide a 10-bit DAC. It is understood that serial connection is one of the real benefits of the PSoC block technology. A serial signal may be brought on to the chip and then routed through the necessary analog functions to condition the signal before digital conversion. Filtering may be switched in or out, and scaling may be modified based upon the values discovered. In addition, because analog PSoC blocks are based upon fundamental op-amp circuits, many other functions may be created.

The analog programmable circuit 104 of FIG. 1 includes control register 106 and may also include switched-capacitor circuitry (not shown). Since the switched-capacitor circuitry operates based on clocking signals (e.g., Phi1 clock 124 and Phi2 clock 126), it is appreciated that there are optimum times for writing data to the control register 106 in order to provide the analog signals in the analog programmable block 104 time to settle. Otherwise, the data that is written to the register 106 may corrupt the analog signals thereby rendering them useless for most practical purposes. The analog programmable circuit 104 is coupled to receive a Phi1 clock signal 124 and a Phi2 clock signal 126 that are output by the analog clock generator 102. Within the present embodiment, it is appreciated that together the Phi1 clock signal 124 and Phi2 clock signal 126 output by the analog clock generator 102 comprise a two-phase non-overlapping clock signal. Furthermore, it is understood that Phi1 clock signal 124 and Phi2 clock signal 126 of the present embodiment are each well-suited to be any clocking frequency. For example, Phi1 clock signal 124 and Phi2 clock signal 126 may each include a frequency range of 64 kHz to 4 MHz. Additionally, the analog clock generator 102 also outputs the write window (Phi1W) signal 128 (that is based on the Phi1 clock signal 124) which indicates optimum times that a write operation may be performed with register 106. The Phi1W signal 128 is described in more detailed herein.

The write synchronization circuit 108 is coupled to receive the Phi1W signal 128 from the analog clock generator 102. Furthermore, the microprocessor clock generator 110 is coupled to receive the stall signal 122 output by the write synchronization circuit 108 which causes the microprocessor clock generator 110 to halt outputting clock signal 114 to microprocessor 112. In this fashion, the operations of microprocessor 112 are halted. The write synchronization circuit 108 is also coupled to output the AIOW over-bar signal 120 to the register 106 of the analog programmable block 104. It is appreciated that the AIOW over-bar signal 120 indicates to register 106 that the microprocessor 112 desires to write data into it.

Figure 2:
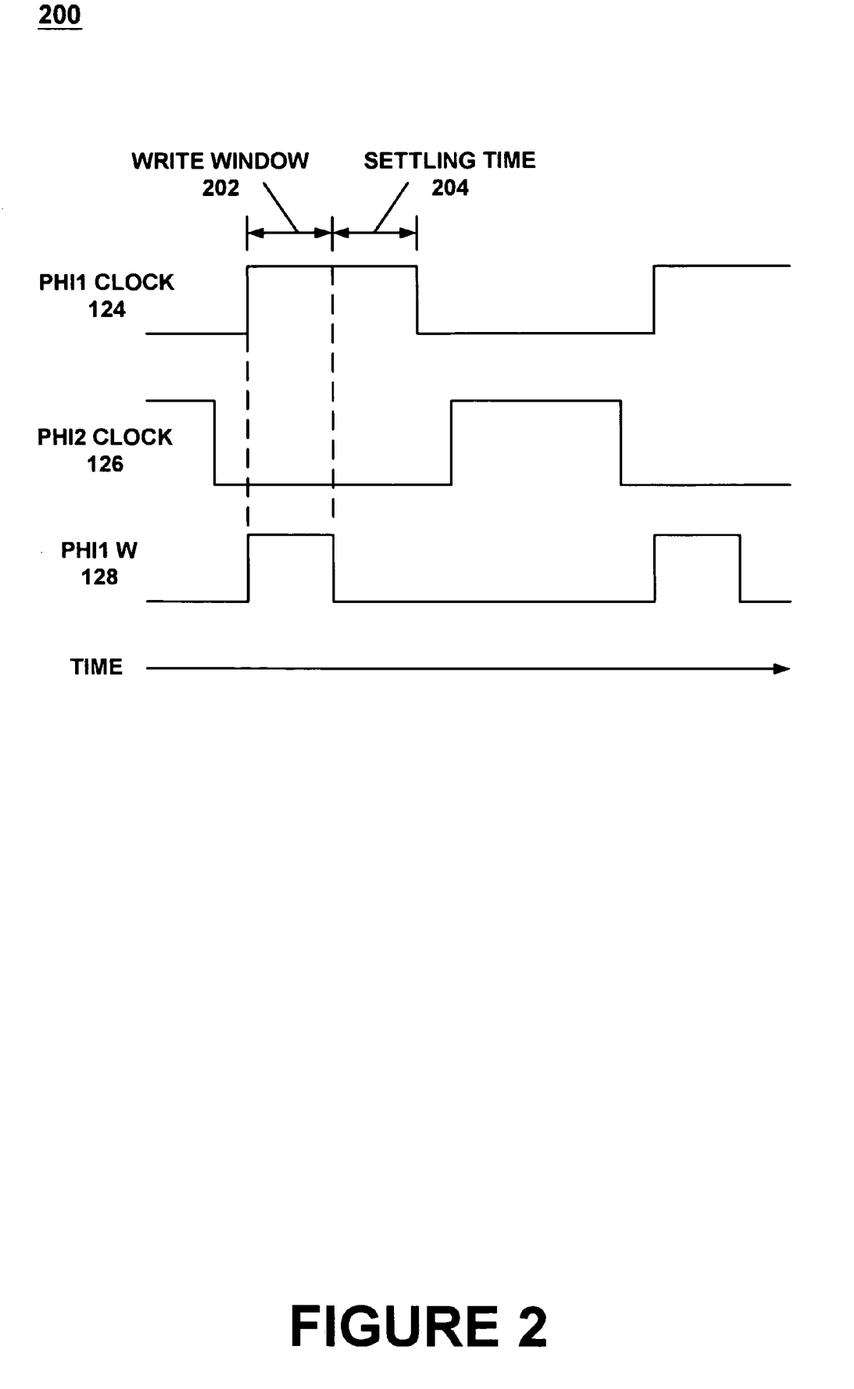
FIG. 2 is a timing diagram of exemplary clocking signals which are output by the analog clock generator of FIG. 1 in accordance with an embodiment of the present invention.

FIG. 2 is a timing diagram 200 of exemplary clocking signals which are output by the analog clock generator 102 of FIG. 1 in accordance with an embodiment of the present invention. Specifically, timing diagram 200 illustrates an embodiment of a write window (Phi1W) signal 128. It is understood that the Phi1W signal 128 is a timing signal indicating optimum times to perform a write operation with register 106 to control the analog programmable block 104. That is, it is the proper time to write to register 106 of the present embodiment so that control data will be received during approximately the first half (write window 202) of the active cycle of the Phi1 clock signal 124. Therefore, if data is written to the register 106 during write window 202, the data will be properly received at the optimum time for controlling the analog programmable block 104. However, if data is written to the register 106 during the second half (settling time 204) of the active cycle of the Phi1 clock signal 124, there may not be enough time for the analog signals to settle thereby compromising the usefulness of them. As such, the Phi1W signal 128 is derived from the Phi1 clock signal 124 in order to mirror the write window 202. In this manner, the Phi1W signal 128 provides a timing signal indicating the optimum times for writing data into the register 106 for controlling (for example) the switch capacitor circuitry of the analog programmable block 104.

Within FIG. 2, it is appreciated that the Phi1W signal 128 of the present embodiment is well-suited to be implemented in a wide variety of ways in order to indicate the optimum times for writing data into the register 106 for controlling analog programmable block 104. For example, the Phi1W signal 128 may be implemented such that it mirrors the settling time 204 or any other part of the active cycle of the Phi1 clocking signal 124. Alternatively, the Phi1W signal 128 may be implemented such that it mirrors any part of the active cycle of the Phi2 clocking signal 126.

Figure 3:
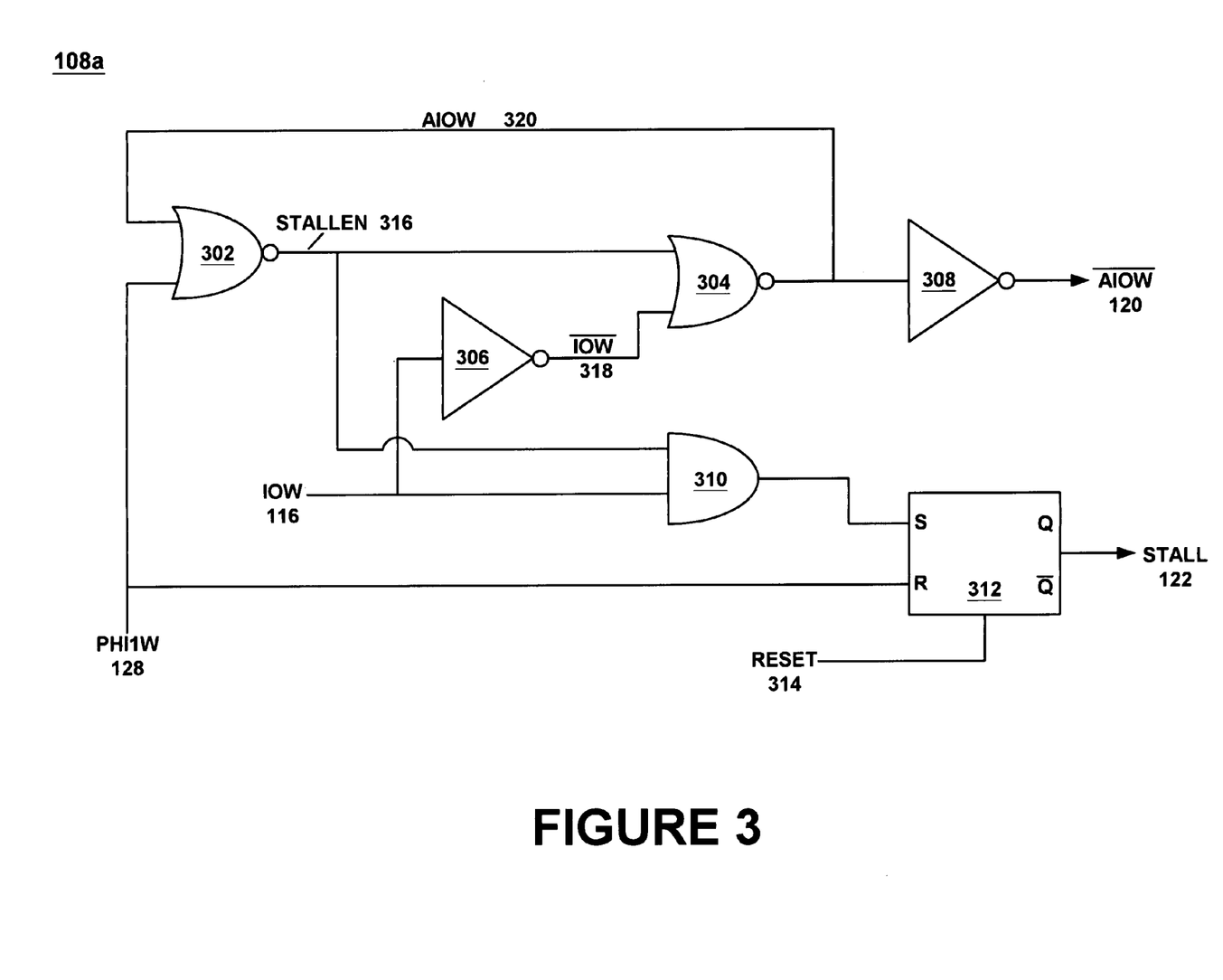
FIG. 3 is an exemplary schematic diagram of the write synchronization circuit of FIG. 1 in accordance with an embodiment of the present invention.

FIG. 3 is an exemplary schematic diagram 108a of the write synchronization circuit 108 of FIG. 1 in accordance with an embodiment of the present invention. As previously mentioned, the write synchronization circuit 108a enables microprocessor 112 to write data into register 106 of the analog programmable block 104 even though the two circuits may be operating at different frequencies. Specifically, upon receiving the IOW signal 116 from the microprocessor 112, the write synchronization circuit 108a utilizes the Phi1W signal 128 to determine whether it is an optimum time for the microprocessor 112 to write to register 106 to control analog programmable block 104. If it is, the write synchronization circuit 108a allows the write operation to proceed unimpeded. However, if the timing is not optimum to write to register 106, the write synchronization circuit 108a asserts a stall signal 122 that halts the operations of microprocessor 112 until the Phi1W signal 128 indicates that the timing is optimum to write to the register 106 to control analog programmable block 104.

Figure 4A:
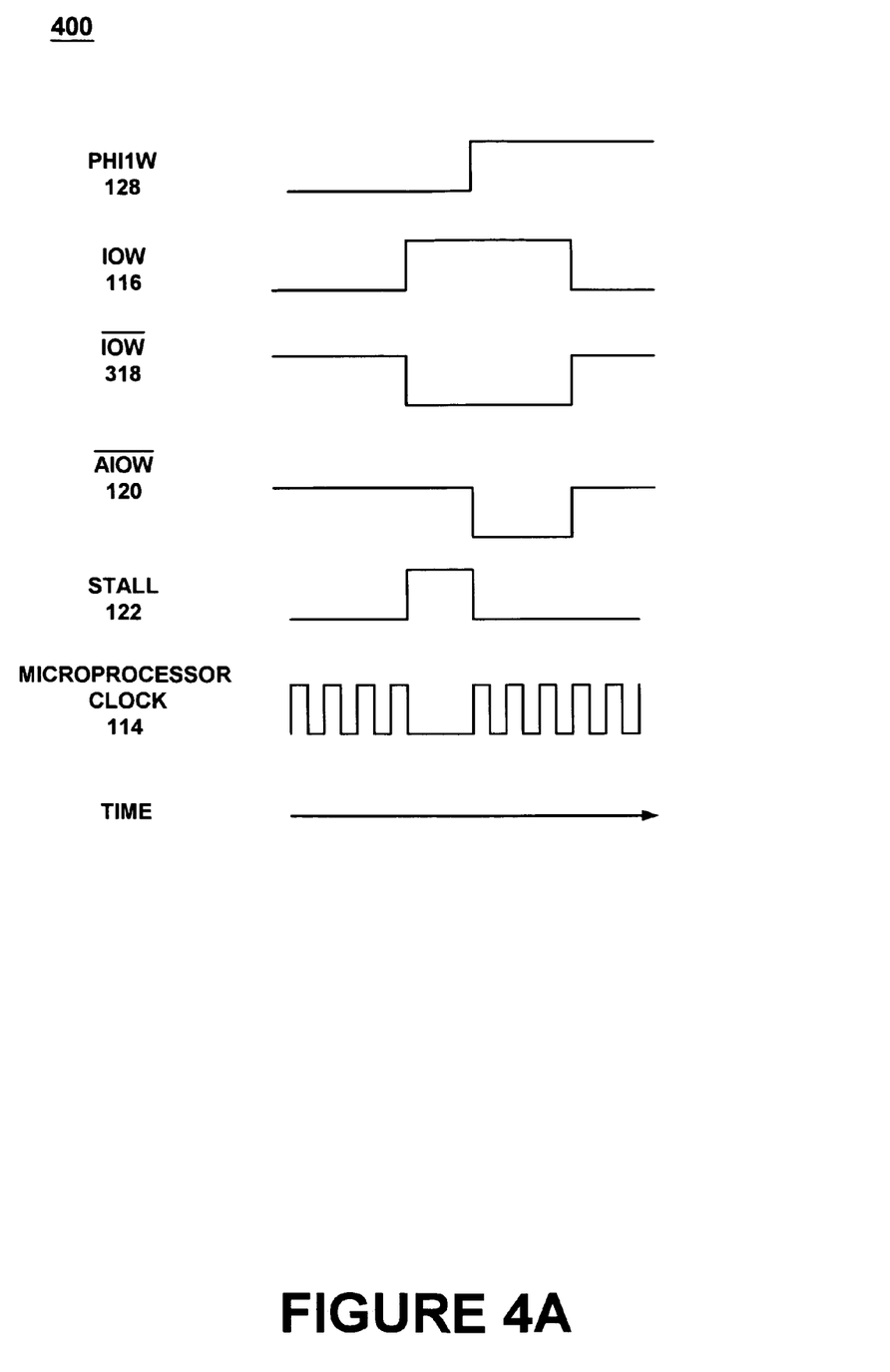
FIG. 4A is an exemplary timing diagram illustrating the operation of the write synchronization circuit of FIG. 3 when a write cycle signal is received and the timing is not optimum to write into an analog programmable block in accordance with an embodiment of the present invention.
Figure 4B:
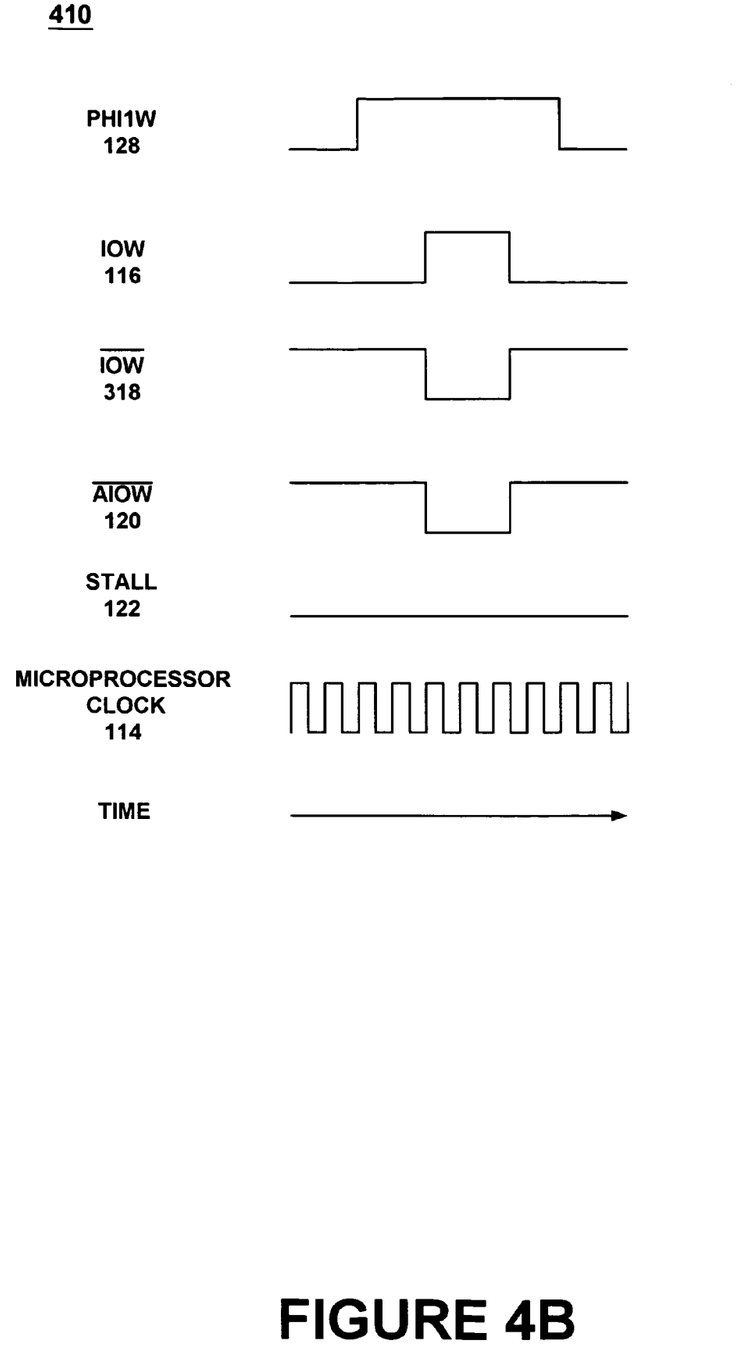
FIG. 4B is an exemplary timing diagram illustrating the operation of the write synchronization circuit of FIG. 3 when a write cycle signal is received during an optimum time for writing into the analog programmable block in accordance with an embodiment of the present invention.
Figure 4C:
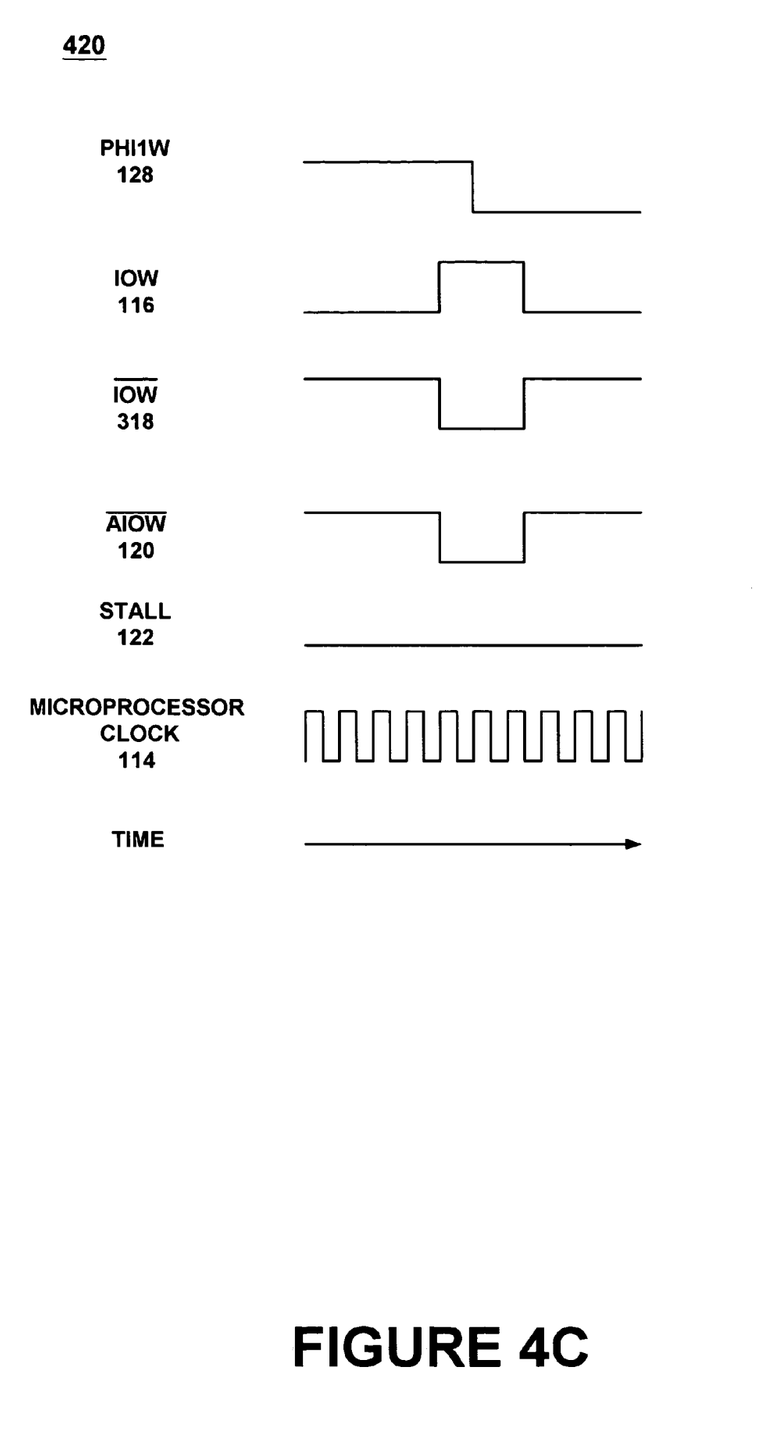
FIG. 4C is an exemplary timing diagram illustrating the operation of the write synchronization circuit of FIG. 3 when a write cycle signal is received during an optimum time for writing into the analog programmable block and continues to be asserted beyond the optimum time in accordance with an embodiment of the present invention.

In order to more thoroughly understand the operations of the write synchronization circuit 108a of FIG. 3, it will be described in conjunction with the timing diagrams shown in FIGS. 4A–4C. Within the present embodiment of the write synchronization circuit 108a, there are three main operating scenarios. For example, FIG. 4A is an exemplary timing diagram 400 that illustrates when the IOW signal 116 is received and the Phi1W signal 128 is low (outside writing window), the write synchronization circuit 108a asserts the stall signal 122 thereby halting the operations of the microprocessor 112 until the rising edge of the Phi1W signal 128 indicates the optimum time to write into register 106 to control analog programmable block 104. Additionally, FIG. 4B is an exemplary timing diagram 410 that illustrates when the IOW signal 116 is received and the Phi1W signal 128 is high (inside writing window), the write synchronization circuit 108a outputs the AIOW over-bar signal 122 to the register 106 in order to allow the write operation to proceed unimpeded. Furthermore, FIG. 4C is an exemplary timing diagram 420 that illustrates when the IOW signal 116 continues to be received after the Phi1W signal 128 has gone low (extends beyond writing window), the write synchronization circuit 108a continues to output the AIOW over-bar signal 122 to the register 106 in order to allow the write operation to continue unimpeded regardless of its duration.

More specifically, during the initial state of operation of the write synchronization circuit 108a of FIG. 3, the stall signal 122 is initially set low (e.g., zero volts), the Phi1W signal 128 is set low, the IOW signal 116 is set low, the IOW over-bar signal 318 is high, the AIOW signal 320 is set low, the AIOW over-bar signal 120 is set high, and the stall enable (StallEn) signal 316 is high. It should be appreciated that the initial states of some of the above mentioned signals are illustrated in FIG. 4A. Therefore, when the Phi1W signal 128 is low and the microprocessor 112 transmits the IOW signal 116 asserted high (as shown in FIG. 4A), an AND gate 310 and an inverter circuit 306 of the write synchronization circuit 108a are coupled to receive it. As such, the inverter circuit 306 outputs the IOW over-bar signal 318 asserted low which is received by a NOR gate 304. However, the NOR gate 304 continues to output the AIOW signal 320 asserted low because one of its inputs is asserted high (e.g., StallEn signal 316) while its other input is assert low (e.g., IOW over-bar signal 318). Therefore, the asserted high value of the AIOW over-bar signal 120 output by an inverter circuit 308 remains unchanged.

Furthermore, upon receiving the high asserted IOW signal 116, the AND gate 310 outputs a high signal because both of its inputs (e.g., StallEn signal 316 and IOW signal 116) are asserted high. Additionally, the S input of a SR flip-flop 312 is coupled to receive the high output signal of the AND gate 310. Consequently, the SR flip-flop 312 outputs stall signal 122 that is asserted high since its S input is high and its R input is low. In this manner, the high asserted stall signal 122 halts the operation of the microprocessor clock signal 114 (as shown in FIG. 4A) thereby halting the operations of the microprocessor 112.

When the analog clock generator 102 transmits the rising edge of the Phi1W signal 128, a NOR gate 302 and the SR flip-flop 312 of the write synchronization circuit 108a (FIG. 3) are coupled to receive it. Specifically, the NOR gate 302 outputs the StallEn signal 316 asserted low because one of its inputs is low (e.g., AIOW signal 320) while its other input is high (e.g., Phi1W signal 128). The NOR gate 304 and the AND gate 310 are coupled to receive the low asserted StallEn signal 316 that was output by the NOR gate 302. As such, the AND gate 310 outputs a low signal because one of its inputs is high (e.g., IOW signal 116) while its other input is low (e.g., StallEn signal 316). Consequently, the SR flip-flop 312 outputs the stall signal 122 asserted low because its S input is low while its R input is high. It is understood that once the microprocessor clock generator 110 receives the low asserted stall signal 122, the microprocessor clock signal 114 will be reactivated (as shown in FIG. 4A).

At substantially the same time, upon receiving the low asserted StallEn signal 316, the NOR gate 304 outputs the AIOW signal 320 asserted high because both of its inputs are low (e.g., IOW over-bar signal 318 and StallEn signal 316). The inverter circuit 308 is coupled to receive the low asserted AIOW signal 320 from the NOR gate 304. As such, the inverter circuit 308 outputs the AIOW over-bar signal 120 asserted low (as shown in FIG. 4A). It is appreciated that the low asserted AIOW over-bar signal 120 indicates to the register 106 that the microprocessor 112 wants to write data into it. Additionally, the NOR gate 302 is also coupled to receive the high asserted AIOW signal 320 output by the NOR gate 304. However, the NOR gate 302 continues to output the high asserted StallEn signal 316 because both of its inputs are high (e.g., Phi1W signal 128 and AIOW signal 320).

At some subsequent time, the IOW signal 116 is asserted low by the microprocessor 112 (as shown in FIG. 4A). Consequently, the AND gate 310 and the inverter circuit 306 receive the low asserted IOW signal 116. As a result, the inverter circuit 306 outputs the IOW over-bar signal 318 asserted high (as shown in FIG. 4A) which is received by NOR gate 304. The NOR gate 304 outputs the AIOW signal 320 asserted low because one of its inputs is low (e.g., StallEn signal 316) while its other input is high (e.g., IOW over-bar signal 318). The NOR gate 302 receives the low asserted AIOW signal 320 but continues to output the low asserted StallEn signal 316 because one of its inputs is high (e.g., Phi1W signal 128) while its other input is low (e.g., AIOW signal 320). However, when the inverter circuit 308 receives the low asserted AIOW signal 320, it outputs the AIOW over-bar signal 120 asserted high (as shown in FIG. 4A). It is understood that the high asserted AIOW over-bar signal 120 indicates to the register 106 the completion of the write operation. In this manner, when the IOW signal 116 is received and the Phi1W signal 128 is low (outside writing window), the write synchronization circuit 108a asserts the stall signal 122 thereby halting the operations of the microprocessor 112 until the rising edge of the Phi1W signal 128 indicates the optimum time to write into register 106 for controlling analog programmable block 104.

When the Phi1W signal 128 is high and the microprocessor 112 transmits the IOW signal 116 asserted high (as shown in FIG. 4B), the write synchronization circuit 108a outputs the AIOW over-bar signal 120 low asserted to the register 106 in order to allow the write operation to proceed unimpeded. Specifically, when the microprocessor 112 transmits the high asserted IOW signal 116, the inverter circuit 306 and the AND gate 310 of the write synchronization circuit 108a receive it. However, the AND gate 310 continues to output a low signal because one of its inputs is high (e.g., IOW signal 116) while its other input is low (e.g., StallEn signal 316). As such, the low asserted stall signal 122 output by the SR flip-flop 312 remains unchanged (as shown in FIG. 4B) because the signal at its S and R inputs remain unchanged.

Conversely, upon receiving the high asserted IOW signal 116, the inverter 306 outputs the IOW over-bar signal 318 asserted low (as shown in FIG. 4B) which is received by the NOR gate 304. Consequently, the NOR gate 304 outputs the AIOW signal 320 asserted high because both of its inputs are low (e.g., StallEn signal 316 and IOW over-bar signal 318). The NOR gate 302 receives the high asserted AIOW signal 320 but continues to output the low asserted StallEn signal 316 because both of its inputs are high (e.g., Phi1W signal 128 and AIOW signal 320). However, upon receiving the high asserted AIOW signal 320, the inverter 308 outputs the AIOW over-bar signal 120 asserted low (as shown in FIG. 4B) which is subsequently received by the register 106. It is appreciated that the low asserted AIOW over-bar signal 120 indicates to the register 106 that the microprocessor 112 desires to write data into it.

Subsequently, the IOW signal 116 is asserted low by the microprocessor 112 (as shown in FIG. 4B). Consequently, the AND gate 310 and the inverter circuit 306 receive the low asserted IOW signal 116. As such, the inverter 306 outputs the IOW over-bar signal 318 asserted high (as shown in FIG. 4B) which is received by NOR gate 304. The NOR gate 304 outputs the AIOW signal 320 asserted low because one of its inputs is low (e.g., StallEn signal 316) while its other input is high (e.g., IOW over-bar signal 318). The NOR gate 302 receives the low asserted AIOW signal 320 but continues to output the StallEn signal 316 asserted low because one of its inputs is high (e.g., Phi1W signal 128) while its other input is low (e.g., AIOW signal 320). However, when the inverter 308 receives the low asserted AIOW signal 320, it outputs the AIOW over-bar signal 120 asserted high (as shown in FIG. 4B). It is understood that the high asserted AIOW over-bar signal 120 indicates to the register 106 the completion of the write operation.

Moreover, at some later time, the Phi1W signal 128 is asserted low (as shown in FIG. 4B) which is received by the SR flip-flop 312 and the NOR gate 302. The SR flip-flop 312 continues to output the low asserted stall signal 122 because its S and R inputs are both low which constitute a no change state for its Q output. However, when the low asserted Phi1W signal 128 is received by the NOR gate 302, it outputs the StallEn signal 316 asserted high which is received by the AND gate 310 and the NOR gate 304. However, the outputs of the AND gate 310 and the NOR gate 304 remain unchanged. In this manner, when the high asserted IOW signal 116 is received while the Phi1W signal 128 is high (inside writing window), the write synchronization circuit 108a outputs the low asserted AIOW over-bar signal 120 to the register 106 in order to allow the write operation to proceed unimpeded.

When the IOW signal 116 continues to be asserted high after the Phi1W signal 128 has gone low (as shown in FIG. 4C), the write synchronization circuit 108a continues to output the AIOW over bar signal 120 asserted low to the register 106 in order to allow the write operation to continue unimpeded regardless of its duration. Specifically, while the Phi1W signal 128 is asserted high the microprocessor 112 transmits the high asserted IOW signal 116. As such, the inverter circuit 306 and the AND gate 310 of the write synchronization circuit 108a receive the high asserted IOW signal 116. However, the AND gate 310 continues to output a low signal because one of its inputs is low (e.g., StallEn signal 316) while the other input is high (e.g., IOW signal 116). Therefore, the low asserted stall signal 122 output by SR flip-flop 312 remains unchanged (as shown in FIG. 4C) because its inputs remain unchanged.

Conversely, when the inverter 306 receives the high asserted signal 116, it outputs the IOW over-bar signal 318 asserted low (as shown in FIG. 4C) which is received by the NOR gate 304. As such, the NOR gate 304 outputs the AIOW signal 320 asserted high because both of its inputs are low (e.g., StallEn signal 316 and IOW over-bar signal 318). The high asserted AIOW signal 320 is received by the NOR gate 302 which continues to output the low asserted StallEn signal 316 because both of its inputs are high (Phi1W signal 128 and AIOW signal 320). However, the inverter 308 receives the high asserted AIOW signal 320 and outputs the AIOW over-bar signal 120 asserted low (as shown in FIG. 4C). It is understood that the low asserted AIOW over-bar signal 120 is subsequently received by the register 106. The low asserted AIOW over-bar signal 120 indicates to the register 106 that the microprocessor 112 desires to write data into it.

Subsequently, the Phi1W signal 128 is asserted low by the analog clock generator 102 (as shown in FIG. 4C) while the IOW signal 116 remains asserted high. As such, the NOR gate 302 and the SR flip-flop 312 receive the low asserted Phi1W signal 128. When the NOR gate 302 receives the low asserted Phi1W signal 128, it continues to output the low asserted StallEn signal 316 because one of its inputs is high (e.g., AIOW signal 320) while the other input is low (e.g., Phi1W signal 128). Furthermore, even though the SR flip-flop 312 receives the low asserted Phi1W signal 128, it continues to output the low asserted stall signal 122 (as shown in FIG. 4C) because its S and R inputs are both low which constitute a no change state for its Q output.

Eventually, the IOW signal 116 is asserted low by the microprocessor 112 (as shown in FIG. 4C). As such, the AND gate 310 and the inverter circuit 306 receive the low asserted IOW signal 116. Consequently, the inverter 306 outputs the IOW over-bar signal 318 asserted high (as shown in FIG. 4C) which is received by NOR gate 304. The NOR gate 304 outputs the AIOW signal 320 asserted low because one of its inputs is low (e.g., StallEn signal 316) while its other input is high (e.g., IOW over-bar signal 318). The NOR gate 302 receives the low asserted AIOW signal 320 and outputs the StallEn signal 316 asserted high because both of its inputs are low (e.g., Phi1W signal 128 and AIOW signal 320). Additionally, when the inverter 308 receives the low asserted AIOW signal 320, it outputs the AIOW over-bar signal 120 asserted high (as shown in FIG. 4C). It is appreciated that the high asserted AIOW over-bar signal 120 indicates to the register 106 the completion of the after the Phi1W signal 128 has been asserted low (extends beyond writing window), the write synchronization circuit 108a continues to output the low asserted AIOW over-bar signal 120 to the register 106 in order to allow the write operation to continue unimpeded regardless of its duration.

It should be noted that before any operation begins within the write synchronization circuit 108a of FIG. 3, a reset signal 314 may be received by the SR flip-flop 312 in order to set the initial state of its Q output (stall signal 122).

Figure 5:
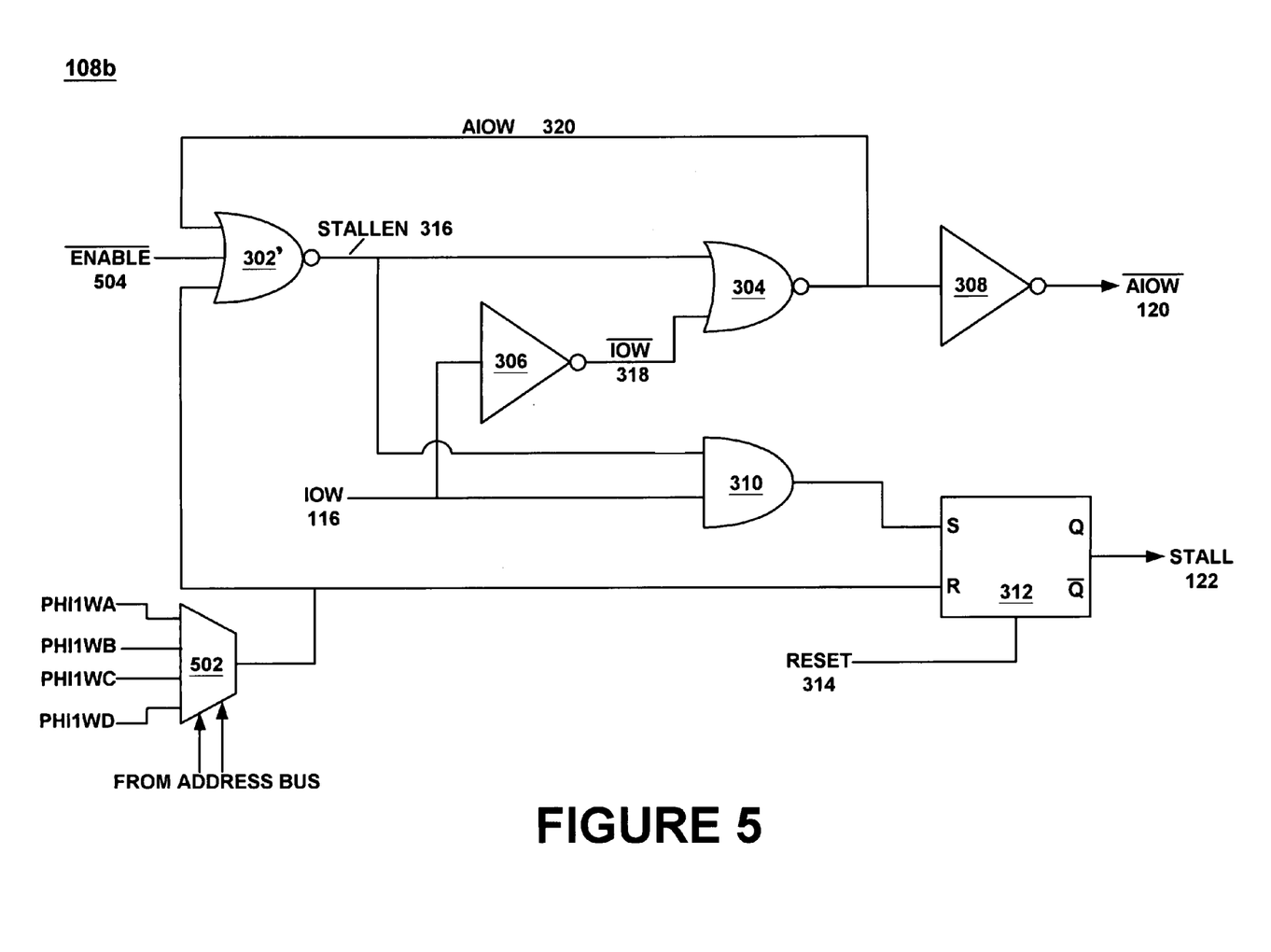
FIG. 5 is an exemplary schematic diagram of the write synchronization circuit of FIG. 1 in accordance with another embodiment of the present invention.

FIG. 5 is an exemplary schematic diagram 108b of the write synchronization circuit 108 of FIG. 1 in accordance with another embodiment of the present invention. The write synchronization circuit 108b enables microprocessor 112 to write data into register 106 of the analog programmable block 104 even though the two circuits may be operating at different frequencies. It should be appreciated that the write synchronization circuit 108b of FIG. 5 operates in manner similar to the write synchronization circuit 108a of FIG. 3, described herein. However, there are some differences that should be noted. One of the differences is that the write synchronization circuit 108b has the ability to synchronize a write operation to any number of different clocking signals of any number of different analog circuits.

For example, the write synchronization circuit 108b of FIG. 5 may be coupled to four different analog programmable blocks (e.g., 104) that each utilize a different timing signal. As such, the write synchronization circuit 108b includes a multiplexer (Mux) circuit 502 that is able to receive (for example) four different write window signals (e.g., Phi1WA, Phi1WB, Phi1WC and Phi1WD) which indicate the optimum timing for writing data to each of the different analog programmable blocks. Furthermore, since the microprocessor 112 outputs an address to an address bus (not shown) for the analog programmable circuit (e.g., 104) that it wants to write data to, the Mux 502 may be coupled to the address bus such that the received address causes the Mux 502 to output the write window signal (e.g., Phi1WA, Phi1WB, Phi1WC or Phi1 WD) corresponding to that particular analog programmable circuit.

The write synchronization circuit 108b of FIG. 5 also includes a NOR gate 302' which operates in a manner similar to the NOR gate 302 of FIG. 3. However, the NOR gate 302' of FIG. 5 includes a third input that is coupled to an enable over-bar signal 504. Specifically, the enable over-bar signal 504 may be utilized to activate or "deactivate" the write synchronization circuit 108b. Specifically, when the enable over-bar signal 504 is asserted high the write synchronization circuit 108b is "deactivated." It should be understood that when the write synchronization circuit 108b is deactivated, it allows the microprocessor 112 to perform unimpeded write operations to register 106 for controlling analog programmable block 104. That is, when the microprocessor 112 transmits any high asserted IOW signals 116, the write synchronization circuit 108b outputs the AIOW over-bar signal 120 asserted low to the register 106 in order to allow the write operation to proceed unobstructed. Additionally, when the write synchronization circuit 108b is deactivated by the high asserted enable over-bar signal 504, the stall signal 122 remains unchanged regardless of any other signals that the write synchronization circuit 108b receives.

However, when the enable over-bar signal 504 is asserted low the write synchronization circuit 108b is activated. It is appreciated that when the write synchronization circuit 108b is activated, the write synchronization circuit 108b is able to operate in a manner similar to the write synchronization circuit 108a of FIG. 3, described herein. Alternatively, it should be noted that the NOR gate 302' of FIG. 5 along with the enable over-bar signal 504 are well-suited to replace the NOR gate 302 as part of the write synchronization circuit 108a of FIG. 3.

Exemplary Operations in Accordance with the Present Invention

Figure 6:
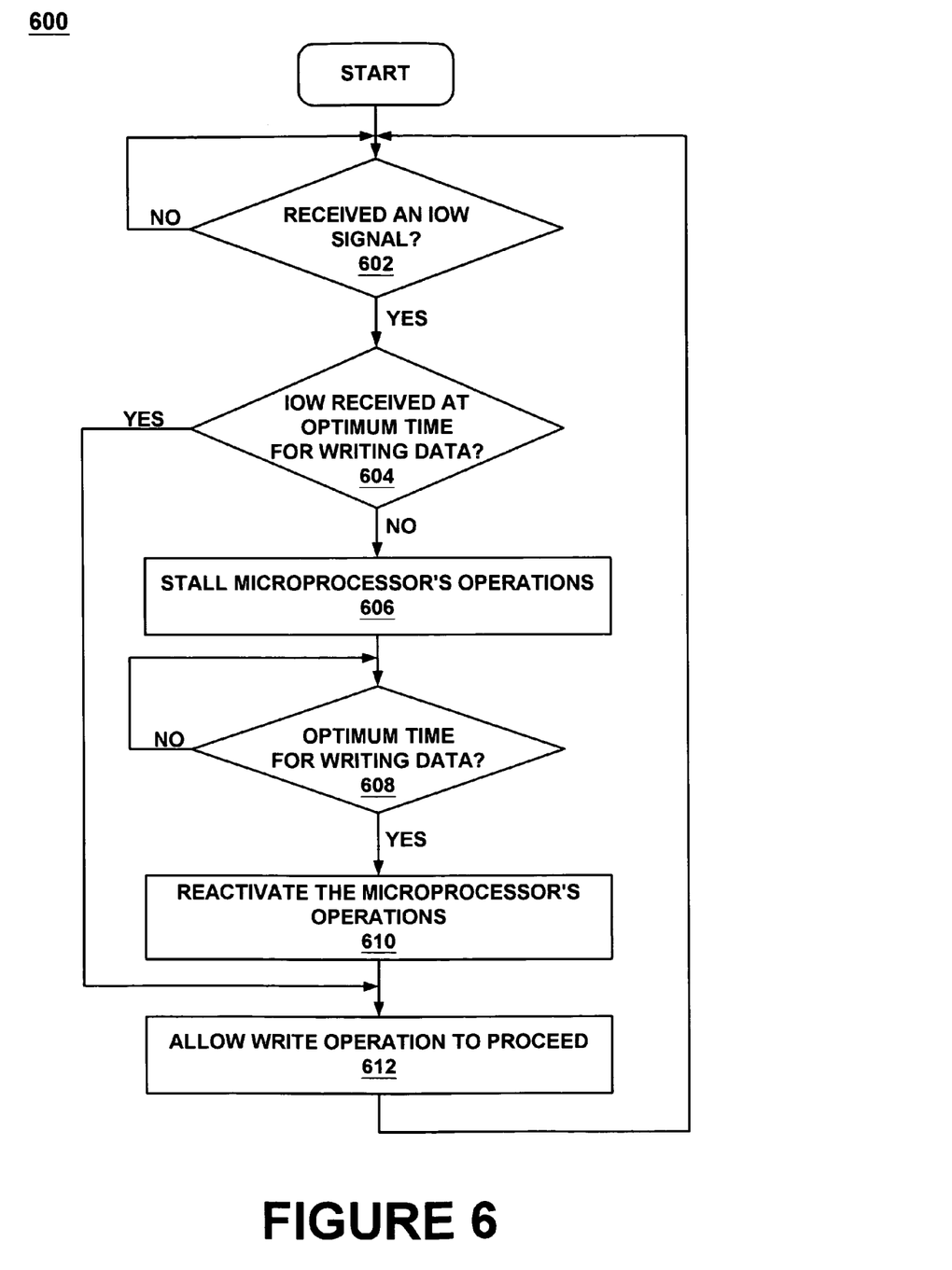
FIG. 6 is a flowchart of steps performed in accordance with one embodiment of the present invention for synchronizing a write operation between a processor and an analog circuit that may be operating at different frequencies.

FIG. 6 is a flowchart 600 of steps performed in accordance with one embodiment of the present invention for synchronizing a write operation between a processor (e.g., 112) and an analog circuit (e.g., 104) that may be operating at different frequencies. It is appreciated that the flowchart 600 may be implemented as part of a microcontroller. Flowchart 600 includes processes of the present invention which, in one embodiment, are carried out by a processor and electrical components that may be under the control of readable and executable instructions. The readable and executable instructions reside, for example, within one or more data storage devices. However, the readable and executable instructions may reside in any type of readable medium. Although specific steps are disclosed in flowchart 600, such steps are exemplary. That is, the present invention is well-suited to performing various other steps or variations of the steps recited in FIG. 6. Within the present embodiment, it should be appreciated that the steps of flowchart 600 may be performed by hardware, by software, or by any combination of software and hardware.

At step 602, the present embodiment determines whether an input/output write (IOW) signal (e.g., 116) has been received. It is understood that the IOW signal of step 602 may have been transmitted by a processor (e.g., 112) indicating a desire to write data into a register (e.g., 106) for controlling an analog circuit (e.g., 104). If the present embodiment determines that an IOW signal has not been received at step 602, the present embodiment proceeds to the beginning of step 602. However, if the present embodiment determines that an IOW signal has been received at step 602, the present embodiment proceeds to step 604.

In step 604 of FIG. 6, the present embodiment determines whether the IOW signal (e.g., 116) was received at an optimum time for writing data into the register (e.g., 106) for controlling the analog circuit (e.g., 104). If the present embodiment determines at step 604 that the IOW signal was received at an optimum time for writing data into the register for controlling the analog circuit, the present embodiment proceeds to step 612. However, if the present embodiment determines at step 604 that the IOW signal was not received at an optimum time for writing data into the register for controlling the analog circuit, the present embodiment proceeds to step 606.

At step 606, the present embodiment stalls the operations of the microprocessor (e.g., 112) causing it to wait until an optimum time for writing data into the register for controlling the analog circuit (e.g., 104 and/or 106). It should be appreciated that the operations of microprocessor of step 606 may be stalled in a wide variety of ways in accordance with the present embodiment. For example, at step 606, the present embodiment may stall the microprocessor clocking signal (e.g., 114) which consequently stalls the operations of the microprocessor. Additionally, at step 606, the present embodiment may stall the microprocessor by putting it into a hold mode or no-op (operations) mode where its clocking signal is still operating but it is not performing any operations.

In step 608 of FIG. 6, the present embodiment determines whether it is an optimum time for the microprocessor (e.g., 112) to write data to the register (e.g., 106) for controlling the analog circuit (e.g., 104). If the present embodiment determines at step 608 that it is not an optimum time for the microprocessor to write data to the register for controlling the analog circuit, the present embodiment proceeds to the beginning of step 608. However, if the present embodiment determines at step 608 that it is an optimum time for the microprocessor to write data to the register for controlling the analog circuit, the present embodiment proceeds to step 610. It is understood that step 608 may be performed in a wide variety of ways in accordance with the present embodiment. For example, the present embodiment may receive a write window signal (e.g., Phi1W 128) that is based on the timing signal (e.g., 124 and/or 126) received by the analog circuit. Specifically, the write window signal may indicate optimum times that a write operation may be performed with the register for controlling the analog circuit (e.g., as described herein with reference to FIGS. 1–5).

At step 610, the present embodiment reactivates the operations of the microprocessor (e.g., 112). It is understood that the present embodiment may reactivate the microprocessor at step 610 in a wide number of different ways. For example, at step 610, the present embodiment may reverse the action it took to initially halt the operations of the microprocessor at step 606. Specifically, the present embodiment at step 610 may reactivate the microprocessor clocking signal (e.g., 114) which consequently activates the operations of the microprocessor. Additionally, at step 610, the present embodiment may revoke the hold mode or no-op mode thereby reactivate the operations of the microprocessor. In step 612, the present embodiment allows the microprocessor (e.g., 112) and the analog circuit (e.g., 104) to perform the write operation wherein data is written and stored within the register (e.g., 106) of the analog circuit. Once step 612 has been completed, the present embodiment proceeds to the beginning of step 602.

Accordingly, embodiments of the present invention provide a method and circuit for synchronizing a write operation between a microprocessor and programmable analog circuit of a microcontroller operating at different frequencies without utilizing too much chip space and without involving complex circuitry.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method comprising:
   (a) a microprocessor initiating a write cycle to store data into a register of an analog circuit, said analog circuit operating on a first clock signal of a first rate and said microprocessor operating on a second clock signal of a second rate;
   (b) asserting a signal to halt operation of said microprocessor until a predefined time frame of said first clock signal, wherein said predefined time frame is advantageous for storing data into said register of said analog circuit, wherein said predefined time frame does not comprise a settling time of said first clock signal; and
   (c) in response to said (b), said microprocessor storing said data into said register of said analog circuit.

2. The method as described in claim 1 wherein said analog circuit comprises a programmable circuit.

3. The method as described in claim 1 wherein said analog circuit comprises a switched-capacitor circuit.

4. The method as described in claim 1 wherein said signal halts said second clock signal.

5. The method as described in claim 1 wherein said predefined time frame comprises approximately an initial half cycle of an active cycle of said first clock signal.

6. The method as described in claim 1 wherein said microprocessor and said analog circuit are part of a microcontroller.

7. A system comprising:
   an analog circuit coupled to receive a first clock signal of a first rate;
   a microprocessor coupled to receive a second clock signal of a second rate and coupled to a register of said analog circuit, said microprocessor for transmitting a write cycle signal to store data into said register of said analog circuit; and
   a synchronization circuit coupled to receive said first clock signal and said write cycle signal and for asserting a signal to halt operation of said microprocessor until a predefined time frame of said first clock signal, wherein said predefined time frame is advantageous for storing data into said register of said analog circuit, wherein said predefined time frame does not comprise a settling time of said first clock signal.

8. The system as described in claim 7 wherein said analog circuit comprises a programmable circuit.

9. The system as described in claim 7 wherein said analog circuit comprises a switched-capacitor circuit.

10. The system as described in claim 7 wherein said signal halts said second clock signal.

11. The system as described in claim 7 wherein said predefined time frame comprises approximately an initial half cycle of an active cycle of said first clock signal.

12. The system as described in claim 7 wherein said system is part of a microcontroller.

13. A method comprising:
    (a) a microprocessor initiating a write cycle to store data into a register of an analog programmable circuit, said analog programmable circuit operating on a first clock signal of a first rate and said microprocessor operating on a second clock signal of a second rate;
    (b) a circuit asserting a signal to halt operation of said microprocessor until a predefined time frame of said first clock signal, wherein said predefined time frame is advantageous for storing data into said register of said analog programmable circuit, wherein said predefined time frame comprises approximately an initial half cycle of an active cycle of said first clock signal; and
    (c) in response to said (b), said microprocessor storing said data into said register of said analog programmable circuit.

14. The method as described in claim 13 wherein said analog programmable circuit comprises a switched-capacitor circuit.

15. The method as described in claim 13 wherein said signal halts said second clock signal.

16. The method as described in claim 13 wherein said predefined time frame does not comprise a settling time of said first clock signal.

17. The method as described in claim 13 wherein said microprocessor, said circuit and said analog programmable circuit are part of a microcontroller.

18. The method as described in claim 13 wherein said circuit is a write synchronization circuit.

19. The method as described in claim 1 wherein said first rate is different from said second rate.

20. The system as described in claim 7 wherein said first rate is different from said second rate.

* * * * *